Sept. 4, 1923.
R. A. RAPKOCK
SAFETY DEVICE FOR PHONOGRAPHS
Filed Oct. 30, 1920
1,466,752
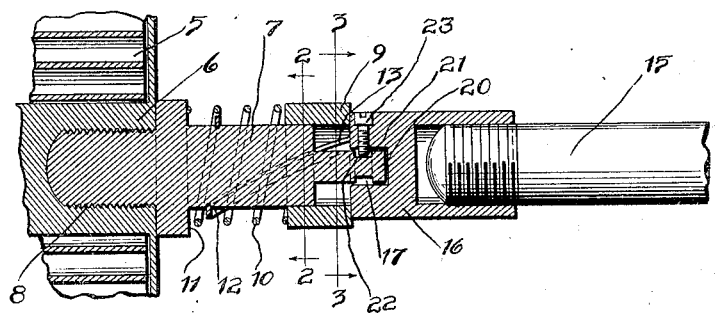
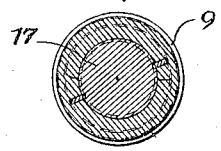
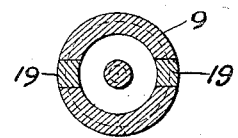
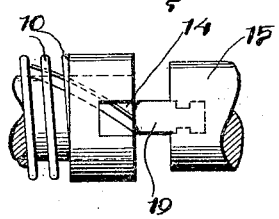
Inventor
Richard A. Rapkock
By Frank H Dring
atty.

Patented Sept. 4, 1923.

1,466,752

UNITED STATES PATENT OFFICE.

RICHARD A. RAPKOCK, OF CHICAGO, ILLINOIS.

SAFETY DEVICE FOR PHONOGRAPHS.

Application filed October 30, 1920. Serial No. 420,848.

*To all whom it may concern:*

Be it known that I, RICHARD A. RAPKOCK, a citizen of the United States, residing at Chicago, in the county of Cook and State of Illinois, have invented new and useful Improvements in Safety Devices for Phonographs, of which the following is a full, clear, concise, and exact description, reference being had to the accompanying drawing, forming a part of this specification.

My invention relates to improvements in safety devices for phonographs, and has for its object the production of a device by means of which the overwinding of the motor is prevented.

A further object is the production of a device in which means are provided for preventing the graphite being squeezed out, and thereby lengthening the life of the motor.

A further object is the production of a device of simple and efficient construction, and one not liable to get out of order.

These and such other objects as may appear hereinafter are attained by my device, an embodiment of which is illustrated in the accompanying drawing, in which—

Figure 1 represents a sectional view showing my device in position on a part of a motor;

Fig. 2 represents a sectional view on the line 2—2 of Fig. 1, looking in the direction indicated by the arrows;

Fig. 3 represents a sectional view on the line 3—3 of Fig. 1, looking in the direction indicated by the arrows; and Fig. 4 represents a perspective view of a part of my device with the operative parts disengaged.

Like numerals of reference indicate like parts in the several figures of the drawing.

Referring now to the drawings—5 indicates the spring of the motor, the leaves of the spring being wound about the central body member 6. A crank extension 7 is screwed into the body member, as indicated at 8, and a safety nut 9 is positioned on the end of the member 7. A spring 10 is mounted between the shoulder 11 of the crank extension 7 and its end.

A spiral guiding flange or thread 12 is inset in the member 7, and a corresponding groove or channel 13 is provided on the interior periphery of the safety nut 9, registering therewith. The nut is slotted, as shown at 14. The crank arm 15 is screwed into an end of the member 16, having a centrally disposed bore 17 within which is mounted the engaging stem 20. The clutch member 16 carries two arms or keys 19 which normally engage in the slots 14 in the slidable nut 9 when the parts are in the winding relation shown in Fig. 1. Thus, when the clutch member 16 is rotated by the crank the keys 19 by their engagement with the slots 14 in the nut 9 effect a winding of the spring to a predetermined point, at which time the nut 9 is forced forwardly to disengage itself from the clutch keys 19. The stem has a round head and a circumferential flange 21 within which the end 22 of the screw 23 enters, thus retaining the member in position. The spring 10 is loosely mounted between the nut and the shoulder and is of considerable strength, much greater than the strength of the motor spring of the phonograph, so when the parts are in the position shown in Fig. 1, and the crank is turned to wind the machine, the members are held closely together against the tension of the spring 10. As the winding continues, and the spring 5 is wound tightly, a point is reached at which the tension of the spring 5 is greater than that of the spring 10. When this point is reached, the interior channel on the nut being in engagement with the thread 12 on the member 7, the nut is advanced forwardly against the tension of the spring 5 as the crank is turned. As the nut 9 is advanced forwardly on the spiral 12 due to the continued pressure exerted thereon by the connection through the keys 19 the forward sliding movement of the nut continues until it disengages itself from the keys 19 as shown in Fig. 4. at which time any continued winding rotation by the crank 15 is without effect. The operator now releases his hold on the crank 15 and the nut 9 will snap back into operating position when the slot 14 and key 19 again register. As the spring motor unwinds, so that its tension is less than that of the clutch spring 10, any further operation of the crank arm 15 will effect a further winding of the motor as before.

This device makes it possible to wind the motor, regardless of the number of turns, and when the proper tension has been reached automatically the members are thrown out of engagement, so that no overwinding can occur. At the same time, by reason of this prevention of overwinding, the graphite or other lubricating material between the springs is kept in place without danger of being squeezed out.

It is clear that this device is of such a character as to prevent the breaking of the springs by reason of the overwinding, as much of the difficulty occasioned by overwinding is in the sudden shock thrown on the springs, causing them to break or bend.

It is understood, also, that this device, as a device, can be sold separately and attached to any machine, interposed between the crank and the motor.

Having thus described my invention, I claim as new, and desire to secure by Letters Patent of the United States—

1. In a device of the class described, a spring motor, a spirally threaded stem, a crank, a slotted nut having a spiral groove in its inner periphery arranged to operatively connect said stem and crank, and means for throwing said stem and crank out of operative engagement when a predetermined tension of the spring of said motor has been reached.

2. In a device of the class described, a spring motor, a stem, a crank, a nut arranged to operatively connect said stem and crank, a spring mounted on said stem between said motor and said nut, and means for throwing said stem and crank out of operative engagement when a predetermined tension of the spring of said motor has been reached.

3. In a device of the class described, a spring motor, a spirally threaded stem, a crank, a slotted nut having a spiral groove in its inner periphery arranged to operatively connect said stem and crank, a spring mounted on said stem between said motor and said nut, and means for throwing said stem and crank out of operative engagement when a predetermined tension of the spring of said motor has been reached.

4. In a device of the class described, a spring motor, a stem having a spiral thread on its outer periphery, a slotted nut having a peripheral groove on its inner surface adapted to register with the thread on said stem, a spring on said stem interposed between the motor and the nut, and a crank having an extension adapted to register within the slot in said nut whereby the movement of said nut operates to wind said motor.

5. In a device of the class described, a stem adapted for connection with a motor and having a spiral thread on its outer periphery, a slotted nut having a peripheral groove on its inner surface adapted to register with the thread on said stem, a spring mounted on said stem, and a crank connection having a portion adapted to register within the slot in said nut, and arranged for connection with the crank.

6. In a safety device for phonograph motors, a spring motor and shaft, a winding crank shaft, a nut longitudinally slidable on one of said shafts and having a straight axially aligned engaging face cooperative with a correspondingly shaped engaging face on the other shaft for winding, a spring for holding said faces in winding engagement, and means for throwing said faces out of operative engagement when a predetermined tension of the spring of said motor has been reached.

In witness whereof, I have hereunto subscribed my name.

RICHARD A. RAPKOCK.